M. B. CRESSWELL.
WATER PURIFIER.
APPLICATION FILED APR. 12, 1909.
950,439.
Patented Feb. 22, 1910.
5 SHEETS—SHEET 1.
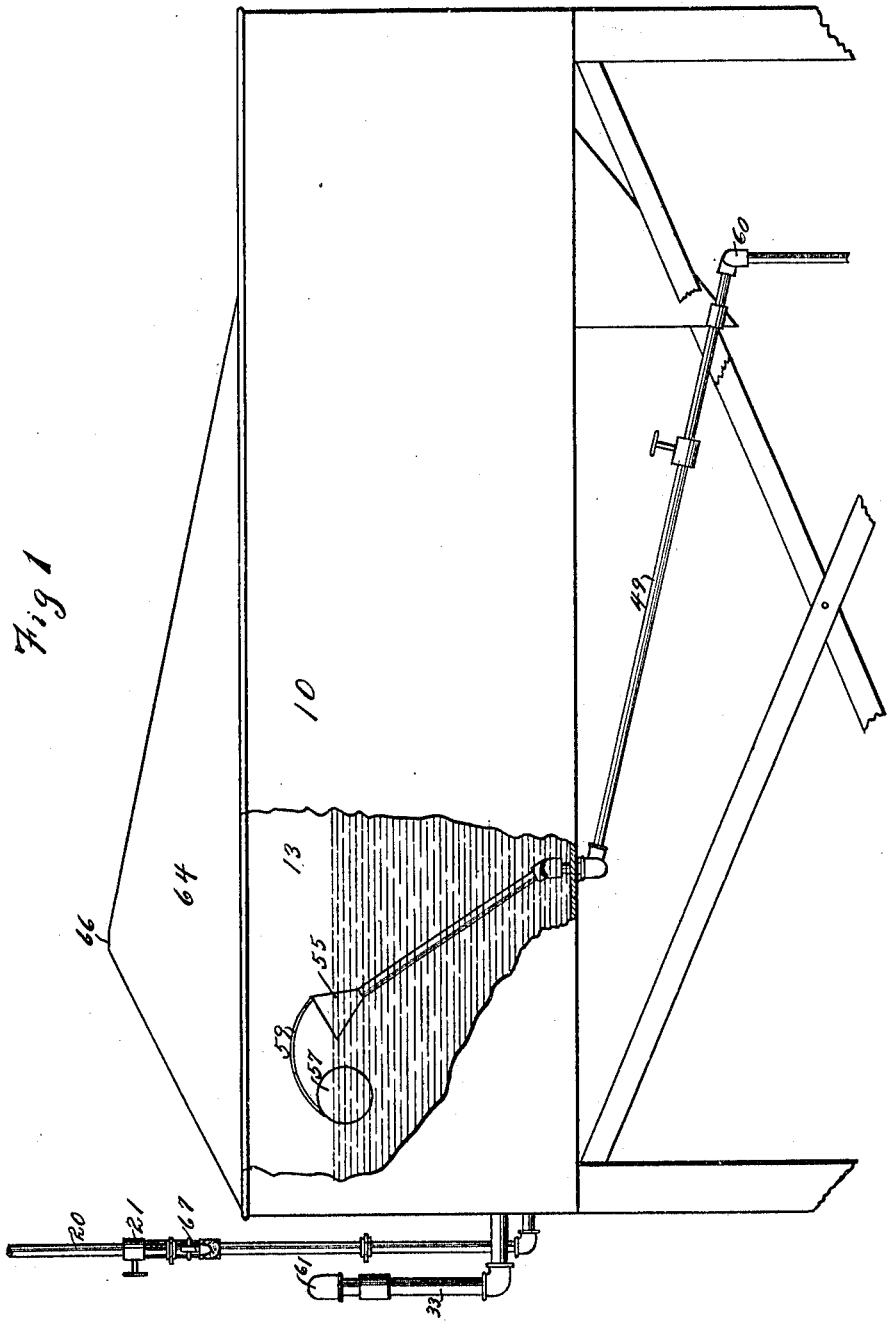
ATTEST
Erle W. Miller
Harry E. Berkey
INVENTOR
Milton B. Cresswell.

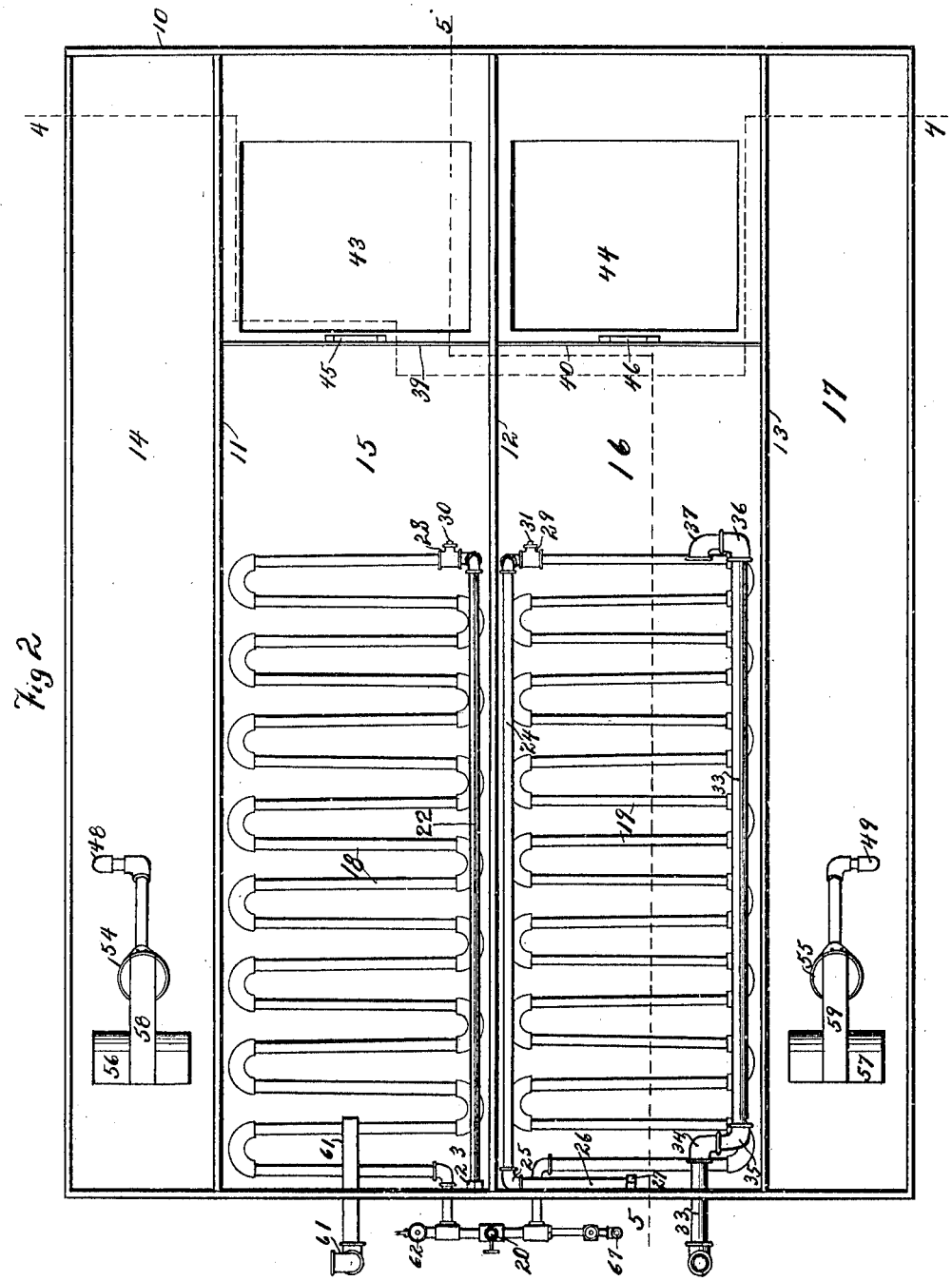

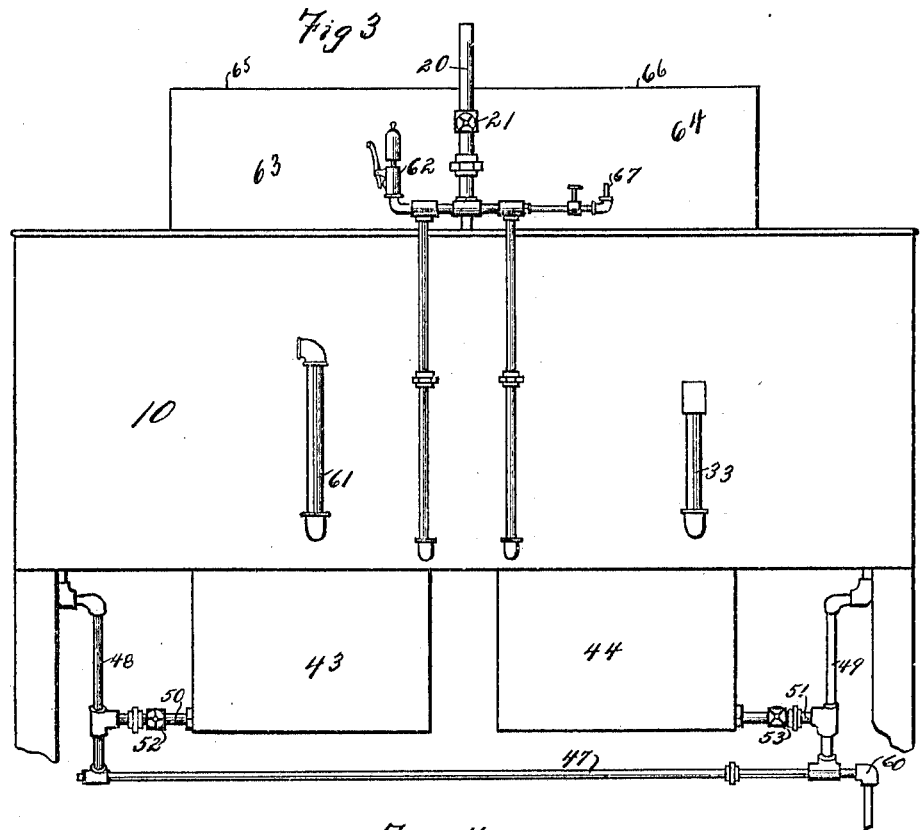
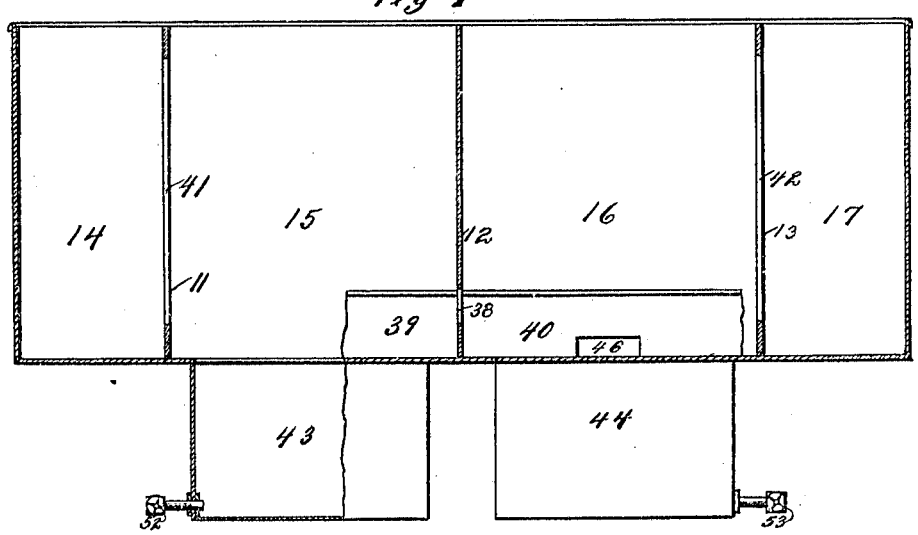

M. B. CRESSWELL.
WATER PURIFIER.
APPLICATION FILED APR. 12, 1909.
950,439.
Patented Feb. 22, 1910.
5 SHEETS—SHEET 4.
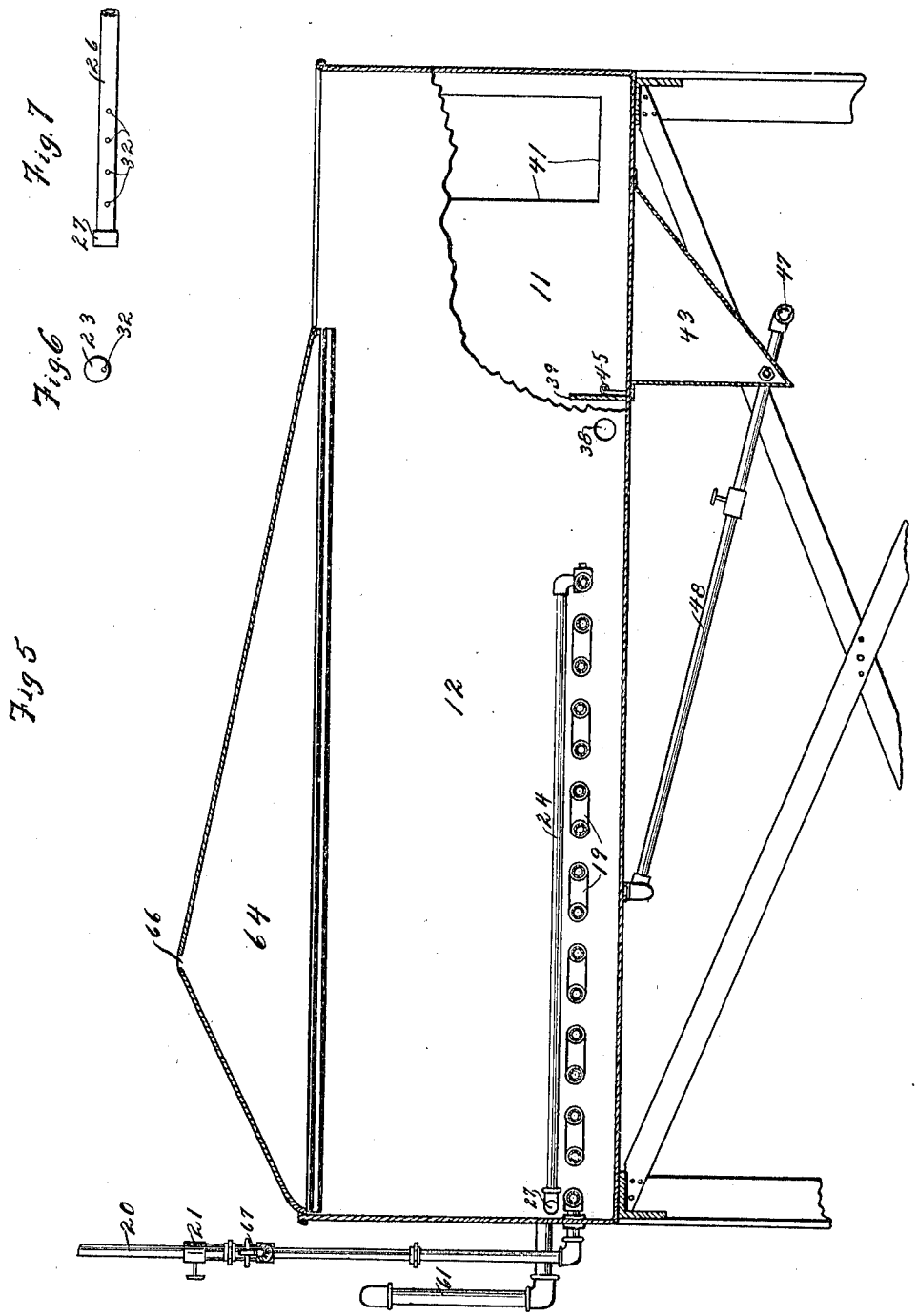
ATTEST
Erle W. Miller
INVENTOR
Milton B. Cresswell

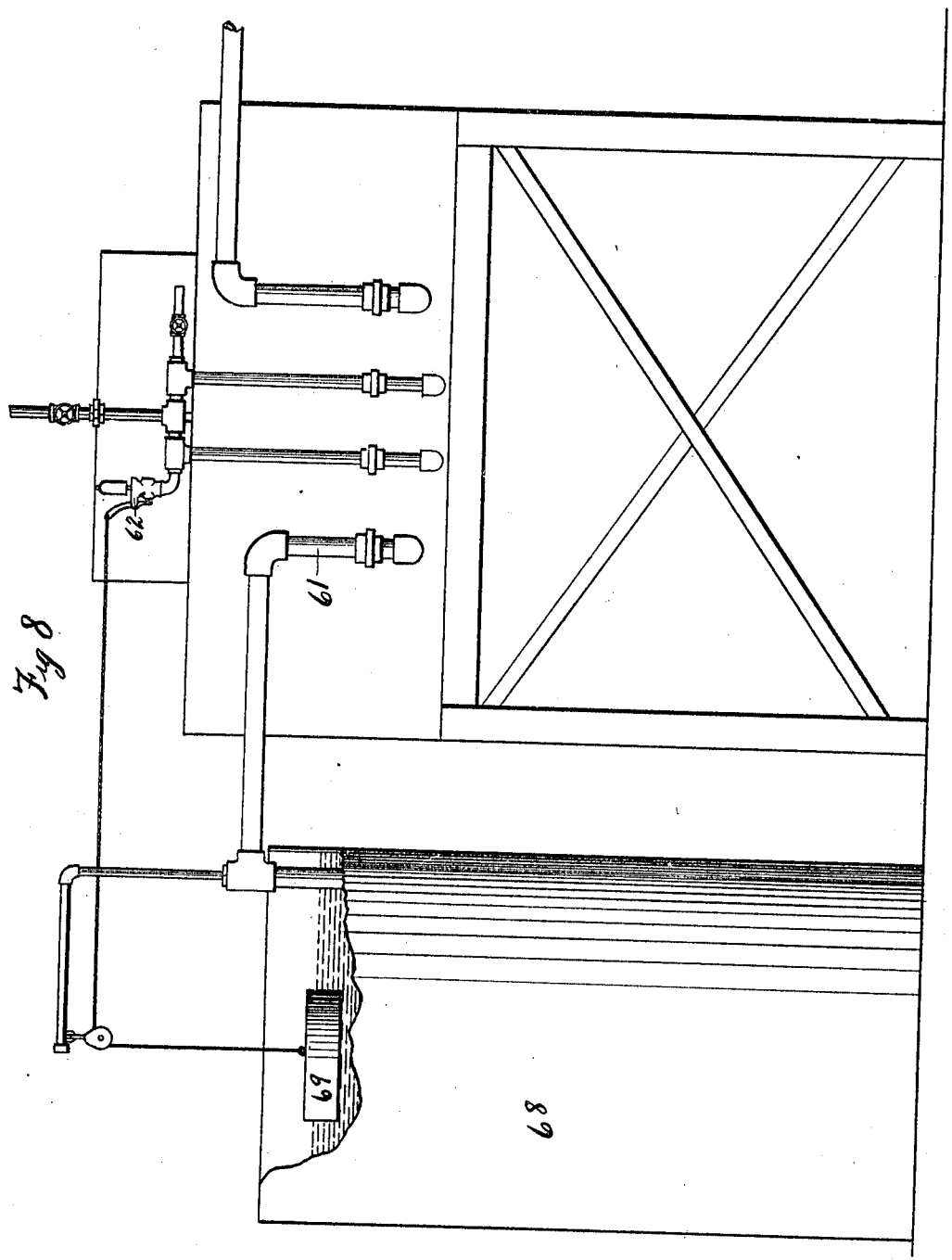

UNITED STATES PATENT OFFICE.

MILTON B. CRESSWELL, OF DES MOINES, IOWA.

WATER-PURIFIER.

950,439.  Specification of Letters Patent.  Patented Feb. 22, 1910.

Application filed April 12, 1909. Serial No. 489,325.

*To all whom it may concern:*

Be it known that I, MILTON B. CRESSWELL, a citizen of the United States of America, and resident of Des Moines, Polk county, Iowa, have invented a new and useful Water-Purifier, of which the following is a specification.

The object of this invention is to provide improved means for separating oils and organic matter from water.

A further object of this invention is to provide improved means for separating oil, organic matter, impurities and undesirable substances from water during the operation of boiling such water.

A further object of this invention is to provide improved means for removing said impurities from the apparatus.

A further object of this invention is to provide means for signaling operator when the water runs low.

My invention consists in the construction, arrangement and combination of elements hereinafter set forth, pointed out in my claims and illustrated by the accompanying drawing, in which—

Figure 1 is a side elevation of the machine or apparatus employed. Fig. 2 is a plan of the machine with covers removed. Fig. 3 is a front end elevation of the machine. Fig. 4 is a cross-section of the machine on the indicated line 4—4 of Fig. 2. Fig. 5 is a cross-section of the machine on the indicated line 5—5 of Fig. 2. Fig. 6 is an end view of the cap on the end of one of the steam pipes. Fig. 7 is a bottom view of another steam pipe. Fig. 8 is a front elevation of machine connected to storage tank.

In the construction of the apparatus as shown, the numeral 10 designates a tank, preferably rectangular in form, and open at its top except as hereinafter specified. A plurality of partitions 11, 12, 13 are mounted in and longitudinally of the tank 10 and subdivide said tank into four compartments 14, 15, 16 and 17. Coils 18, 19 of steam pipe are mounted on or adjacent to the bottoms of the compartments 15, 16 of the tank 10. End portions of the coils 18, 19 extend through the front wall of the tank and upward above said tank and are joined to a common supply pipe 20 leading from a steam boiler. Said supply pipe 20 is provided with a cut-off valve 21. The rear end portion of the steam coil 18 is connected to a pipe 22 which extends to the forward end portion of the compartment 15 and is closed by means of a common cap 23, said cap having a small hole 32 (Fig. 6) in its closed end to allow condensed steam to escape directly into the compartment 15. The rear end portion of the steam coil 19 is connected to a pipe 24 which extends to the forward end portion of the compartment 16 and is connected by an elbow 25 to a short pipe 26 which extends part way across the front end of the compartment 16. The short pipe 26 has a plurality of small holes 32 (Fig. 7) in its under side to allow the condensed steam to escape directly into the compartment 16 and the open end of said pipe 26 is closed by means of a cap 27. The rear ends of the steam coils 18, 19 are provided with tees 28, 29 for the purpose of cleaning the coils by blowing steam through them, the open side of the tees, being normally closed by plugs 30, 31. It may here be stated that steam is piped through the coils 18, 19 from the boiler for the purpose of heating and boiling water in the compartments 15, 16, and such steam is conducted through the pipes 22, 24 to the forward ends of the compartments 15, 16 where it escapes, condensed or not, through the ports 32 into the boiling water. A water supply pipe 33 leads from the condenser (not shown) and enters near the bottom of the forward end portions of the compartments 16. The pipe 33, immediately after entering the compartment 16, is offset by means of two ells 34, 35 and extends rearwardly beyond the center of the compartment 16 where, by means of ells 36, 37, it discharges toward the front end of the compartment 16 and directly over the steam coils 19. A port 38 in the lower portion of the partition 12, at a point just in front of the partitions 39, 40, affords communication between the compartments 15 and 16 in order that water may flow from one compartment to the other. Relatively large openings 41, 42 are provided in the rear end portions of the partitions 11, 13 in order that water may flow back and forth between the compartments 14, 15 and 16, 17. Sediment pockets 43, 44 are provided in the bottoms of the rear portions of the compartments 15, 16.

The numerals 39, 40 designate comparatively low partitions mounted on the bottoms and transversely of the compartments 15, 16 to form dead chambers in the rear end portions of said compartments for the purpose of causing sediment or other heavy impurities to be deposited in the sediment pockets 43, 44. The partitions 39, 40 are provided at the bottoms of their central portions with trap doors 45, 46 which are held shut by gravity and by the natural direction of the flow of water during the operation of the machine; but said trap doors will open automatically to allow water to drain from the forward end portions into the sediment pockets 43, 44 and thence to the sewer by drainage pipes hereinafter described.

A pipe 47 extends transversely of and below the rear portion of the tank 10 and branches 48, 49 extend forward and upward through the bottom of the tank into the forward end portions of the compartments 14, 17. Each of the branches 48, 49 has a branch 50, 51 entering the sediment pockets 43, 44 respectively. The branches 50, 51 are provided with cut-off valves 52, 53 which are normally closed during the operation of the machine. Skimmers 54, 55 are pivotally mounted on the upper end portions of the branches 48, 49 and normally stand at more or less of an angle, as shown in Fig. 1. Each of the skimmers is provided with a funnel mouth on its upper end, the forward portion of the upper margin of which is held somewhat below the surface of the water contained in the compartments 14, 17. Floats 56, 57 are attached by means of flexible strips of metal 58, 59 to the rear portion of the upper margin of the skimmers. The floats 56, 57 may be adjusted by bending the strips 58, 59 so that they hold the forward portions of the upper margins of the skimmers 54, 55 a comparatively short distance below the surface of the water, regardless of the depth thereof, thereby providing automatic adjustment of said skimmers.

One end portion of the pipe 47 is provided with an elbow 60 adapted for connection with a drain or waste pipe. A discharge pipe 61 opens from the forward end portion of the compartment 15 of the tank 10 and through the front wall thereof and leads to a storage tank 68, Fig. 8. Said storage tank being provided with an ordinary float 69, Fig. 8 and said float is connected by any suitable means to a whistle 62 mounted on the steam supply pipe as shown in Fig. 3 in such a manner that when the water in the storage tank falls below any particular level the float descends and pulls the whistle cord, thereby opening the whistle which signals to the operator that the flow of water from said storage tank should be checked.

The forward end portions of the compartments 15, 16 are provided with covers 63, 64 which have comparatively small openings 65, 66 in their uppermost portions, and said covers extend from the front margin of the compartments 15, 16 rearward a distance corresponding to the lengths of the steam coils 18, 19, and extend transversely from wall to wall of their respective compartments.

The operation of the apparatus in practical use is as follows: Water is admitted from a condenser through the pipe 33 to the compartment 16 and is discharged forwardly therein over the steam coil 19. The water flows from the compartment 16 through the port 38 into the compartment 15 and through the ports or openings 41, 42 into the compartments 14, 17. The water is boiled in the compartments 15, 16 by heat radiated from the steam coils 18, 19. The water boils most violently in the forward end portions of said compartments because the steam coils are hottest at that point. Such violent boiling expands and inflates the water with the result that the level of the water is higher in the forward end portions of the compartments 15, 16, thus causing a current of water to flow rearwardly. Upon reaching the rear end of compartments 15, 16 said current divides, the major portion dropping to the bottom of its respective compartment and returning as an undercurrent to the forward end portion of the compartment, where it is again heated. Rising to the surface it proceeds as before and continues this circulation as long as the machine is in operation. The balance of the water is thrown through the openings 41, 42 into the compartments 14, 17 and with it is carried the oil and other undesirable substance which is light enough to float. The water is comparatively quiet in the compartments 14, 17, only a slight circulation being perceptible, the same being, however, enough to carry the oil and other floating substance to the skimmers. There is also a corresponding returning under current. The violent boiling of the water in the forward ends of the compartments 15, 16 inflates and separates the particles of oil, organic matter and undesirable substances. Those portions of the undesirable substances that are volatile under the intense heat of the water in this portion of the compartments 15, 16 are thrown out with the steam through the openings 65, 66 in the covers 63, 64. The remaining portions of such substances are carried back by the current and thrown through the upper part of the openings 41, 42 into the compartments 14, 17 and are carried to the forward ends of said compartments by the slight current prevailing there, where the particles that are lighter than the water are skimmed off by the skimmers 54, 55 and are carried through the pipes 48, 49 into the pipes 47 and thence to the sewer. The remaining particles of impure substances, which are not light enough to float, are carried back by the undercurrent into compartments 15, 16, and are deposited in the sediment pockets 43, 44 as the return current passes back to the steam coils. Such particles as escape separation will be caught during subsequent repetitions of this operation. The water entering the compartment 15 has had the greater portion of its impurities removed by the operations in the compartments 16, 17. The function of the compartments 14, 15 is to remove the impurities not taken out by the operations in the compartments 16, 17. The compartments 14, 15 therefore contain the purest water. At the bottom of the forward end portion of the compartment 15 is the point where the water is entirely free from impurities, or as nearly so as can be attained, for whatever impurities that have not been removed have risen to the surface by the time the water reaches this point. Hence the water is drawn off through the pipes 61 from this point to the storage tank 68, Fig. 8 from which it is piped away for use, such as to the fore-cooler and flat-coils, and thence to the freezing cans employed in the manufacture of ice. The sediment deposited during these operations in the sediment pockets 43, 44 may be drawn out from time to time by opening the valves 52, 53 in the pipes 50, 51 leading from said sediment pockets. The sediment, being mixed more or less with water, will flow out through the pipes 50, 51 and the branches 48, 49 to the pipe 47 and thence to the sewer. A provision is made at 67 (Fig. 3) for attaching a piece of rubber hose to the steam supply pipe by slipping one end of it over a nipple 67. The other end is to be inserted in the mouth of the skimmers for the purpose of cleaning them by blowing live steam therethrough. The plugs 30, 31 may then be removed and steam be blown through the steam coils 18, 19 for the purpose of draining when not in use to prevent freezing.

I do not wish to be understood as limiting myself to the specific construction and arrangement here described, as various modifications and arrangements of the structure and the parts thereof may be employed without departing from the spirit of my invention.

I claim as my invention—

1. A water purifier or reboiler, comprising a tank preferably rectangular in form and comparatively shallow in depth, formed with compartments arranged longitudinally thereof; steam coils in some of said compartments, one end of each of said steam coils connected to a common supply pipe and having their rear ends arranged to discharge the condensation and exhaust steam into the forward ends of their respective compartments; a water pipe discharging into one of said compartments over the steam coils therein; communication between said compartments; skimmers in the compartments not containing steam coils, adapted to work automatically with the water level; a whistle mounted on the steam supply pipe and adapted to be operated by means of a float located in a storage tank; all substantially as illustrated and described.

2. A water purifier, comprising a tank divided into communicating compartments; steam coils in the intermediate compartments, said steam coils connected at their forward ends to a common supply pipe, and having their rear ends arranged to discharge the condensation and the exhaust steam into the forward ends of their respective compartments; skimmers mounted in the end compartments; drainage means connecting with said skimmers; sediment pockets in the rear portions of the intermediate compartments and connected to said drainage pipes; all as set forth.

Signed by me at Des Moines, Iowa, this 27 day of March, 1909.

MILTON B. CRESSWELL.

Witnesses:
ERLE W. MILLER,
W. W. FINK.